US007011049B2

(12) United States Patent
Tomasseli et al.

(10) Patent No.: US 7,011,049 B2
(45) Date of Patent: Mar. 14, 2006

(54) METHOD AND DEVICE FOR COOLING A MOTOR VEHICLE ENGINE

(75) Inventors: Ludovic Tomasseli, Courbevoie (FR); Armel Le Lievre, Montesson (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 127 days.

(21) Appl. No.: 10/181,962

(22) PCT Filed: Jan. 25, 2001

(86) PCT No.: PCT/FR01/00239

§ 371 (c)(1),
(2), (4) Date: Dec. 23, 2002

(87) PCT Pub. No.: WO01/57374

PCT Pub. Date: Aug. 9, 2001

(65) Prior Publication Data

US 2003/0196613 A1    Oct. 23, 2003

(30) Foreign Application Priority Data

Feb. 3, 2000    (FR) .................................. 00 01357

(51) Int. Cl.
F01P 7/16    (2006.01)
(52) U.S. Cl. .................................................. 123/41.02
(58) Field of Classification Search ............. 123/41.02, 123/41.05, 41.06, 41.09, 41.1, 41.31, 41.12
See application file for complete search history.

(56) References Cited

U.S. PATENT DOCUMENTS 4,475,485 A * 10/1984 Sakakibara et al. ...... 123/41.05
4,489,680 A * 12/1984 Spokas et al. ........... 123/41.05
4,913,107 A    4/1990 Schweiger ............... 123/41.54
4,930,455 A * 6/1990 Creed et al. ............... 123/41.1
5,215,044 A    6/1993 Banzhaf et al.
5,241,926 A    9/1993 Sato et al. ............... 123/41.54
5,390,632 A * 2/1995 Ikebe et al. .............. 123/41.02
5,529,025 A * 6/1996 Ranzinger et al. ......... 123/41.1
5,758,607 A    6/1998 Brendel et al.

(Continued)

FOREIGN PATENT DOCUMENTS

DE    40 33 261    4/1992

(Continued)

OTHER PUBLICATIONS

EPO—Patent Abstract of Japan, Publication No. 59119010, dated Jul. 10, 1984. See PCT search report.

(Continued)

Primary Examiner—Henry C. Yuen
Assistant Examiner—Jason Benton
(74) Attorney, Agent, or Firm—Nicolas E. Seckel

(57) ABSTRACT

A method for cooling a motor vehicle engine consists in regulating the volume and the flow rate of a coolant fluid in a hydraulic circuit provided with a degassing bypass hose equipped with an electronically controlled proportional actuator and with means forming direct return of fluid or bypass. The method comprises a step of determining the temperature of the cooling liquid, a step of comparing the temperature of the cooling liquid with a first and second threshold temperature, and a step of controlling the opening of the actuator such that, when the fluid temperature is between the first and the second threshold temperatures, the degree at which the actuator is opened is at least temporarily proportional to the cooling fluid temperature. The invention also concerns a device for cooling a motor vehicle engine.

23 Claims, 5 Drawing Sheets

U.S. PATENT DOCUMENTS

Figure 1:
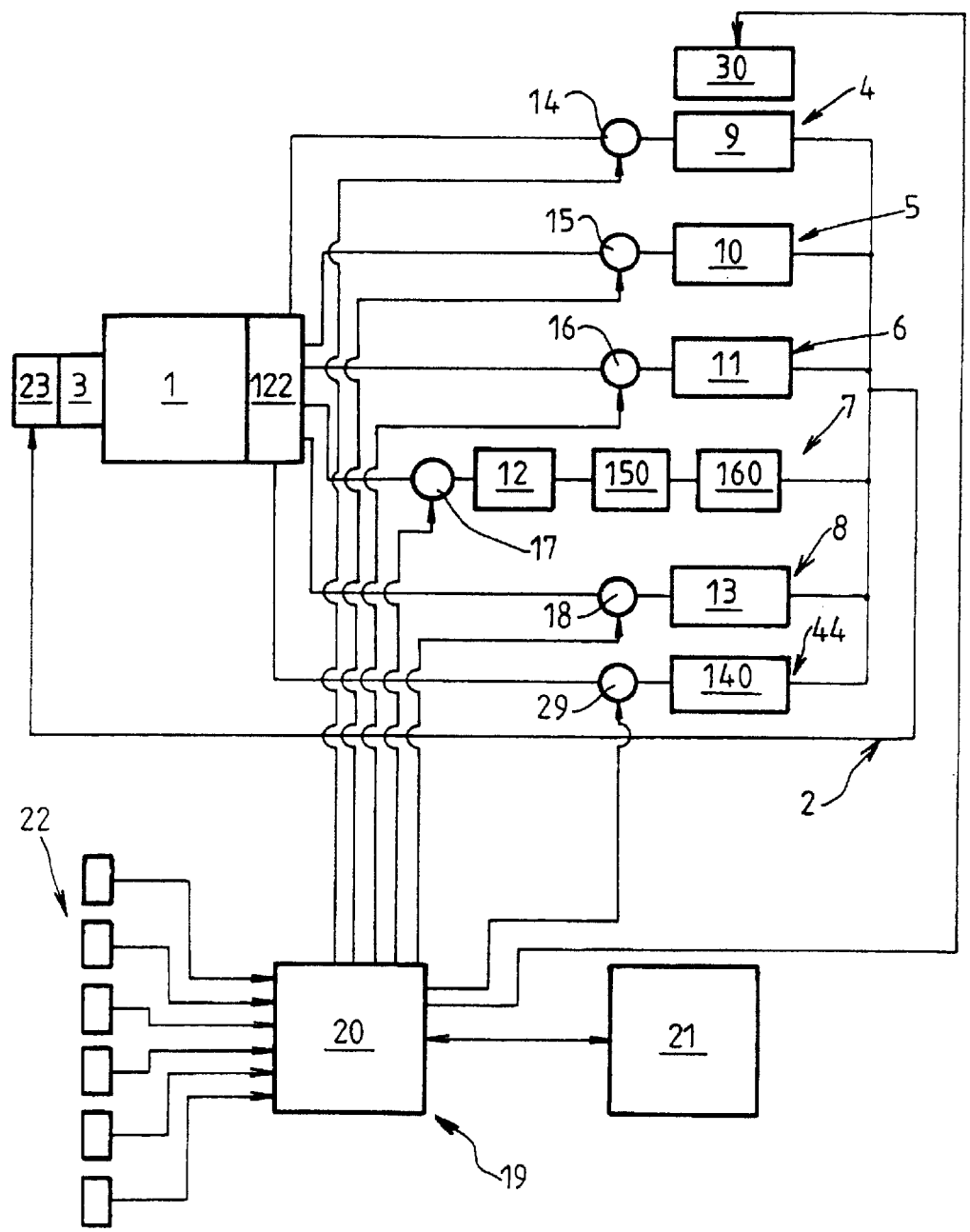

| | | | |
|---|---|---|---|
| 5,799,625 A * | 9/1998 | Ziolek et al. | 123/41.1 |
| 5,836,269 A | 11/1998 | Schneider | 123/41.1 |
| 5,884,243 A * | 3/1999 | Taniguchi et al. | 702/183 |
| 5,950,576 A | 9/1999 | Busato et al. | |
| 5,975,031 A * | 11/1999 | Bartolazzi | 123/41.1 |
| 6,055,947 A * | 5/2000 | Okuno | 123/41.13 |
| 6,182,617 B1 * | 2/2001 | Bigcharles | 123/41.1 |
| 6,308,664 B1 * | 10/2001 | Ambros | 123/41.12 |
| 6,314,920 B1 * | 11/2001 | Suzuki et al. | 123/41.1 |
| 6,688,262 B1 * | 2/2004 | Murakami et al. | 123/41.1 |
| 6,705,586 B1 * | 3/2004 | Williges | 251/129.04 |
| 6,739,290 B1 * | 5/2004 | Iwasaki et al. | 123/41.05 |

FOREIGN PATENT DOCUMENTS

| | | |
|---|---|---|
| DE | 40 33 261 A1 | 4/1992 |
| DE | 41 09 498 A1 | 9/1992 |
| DE | 199 48 160 A1 | 4/2001 |
| EP | 0 499 071 A1 | 8/1992 |
| EP | 0 557 113 A2 | 8/1993 |
| EP | 0 893 581 A2 | 1/1999 |
| FR | 2 722 244 | 1/1996 |
| FR | 2 776 707 | 10/1999 |

OTHER PUBLICATIONS

Von Matthias Banzhaf; ATZ -Supplement, vol. 95, No. 9, pp. 4-6, Sep. 1993.

V. M. Banzhaf; ATZ Automobiltechnische Zeitschrift & Supplement, vol. 95, No. 9, pp. 4-6, Sep. 1, 1993.

* cited by examiner

METHOD AND DEVICE FOR COOLING A MOTOR VEHICLE ENGINE

The invention concerns a method and a device for cooling a motor vehicle engine.

The invention concerns, more particularly, a cooling device comprising a hydraulic circuit of cooling fluid, associated with a pump for circulating it through the engine of the vehicle and different branches of the circuit. Thermal equipment of the vehicle can be arranged in the different branches of the circuit.

Cooling systems are designed to ensure the resistance of the engines to the thermomechanical stresses resulting from combustion. In addition, complementary functions are implemented, beyond the main cooling of the engine, in order to improve the overall efficiency or to provide and guarantee benefits to vehicle users, such as, for example, the heating of the passenger compartment.

The cooling systems are dimensioned using only operation points at maximum speed and full load of the engine, and are thus overdimensioned in the majority of usage cases of the vehicles.

Thus, the operation parameters of the engine are not optimized, which leads to a degradation of its performances, such as an increased consumption, a high level of emission of pollutants, as well as a reduction in the heating and acoustic comfort of the vehicle.

The document DE4033261 describes a cooling system for a combustion engine comprising a circuit of cooling liquid forming a loop with a radiator. The circuit comprises, in addition, a bypass parallel to the radiator that allows the fluid to return directly to the engine. The distribution of the cooling liquid between the radiator and the bypass is ensured by a thermostatic valve. An additional valve makes it possible to block the return of the fluid to the engine in order to accelerate the speed of the increase in temperature of the engine.

However, this cooling system does not optimize the thermal exchanges with the engine.

A purpose of the present invention is to propose a method for cooling a motor vehicle engine, correcting all or a part of the disadvantages of the prior art mentioned above.

This purpose is achieved by the fact that the method for cooling a motor vehicle engine consists in regulating the volume and the flow rate of a cooling fluid in a hydraulic circuit provided with a branch equipped with an electronically controlled proportional actuator and provided with means forming direct return of fluid or bypass, and comprises a step of determining the temperature of the cooling fluid, a step of comparing the temperature determined with a first and a second specified threshold temperature, and a step of controlling the opening of the actuator, so that, when the liquid temperature is between the first and the second threshold temperatures, the degree to which the actuator is opened is at least temporarily proportional to the temperature of the cooling fluid.

According to another characteristic, when the temperature of the fluid is lower than the first threshold temperature, the method comprises a step of cutting off, or limiting to a specified leakage flow rate, the circulation of fluid in the bypass branch.

Another purpose of the present invention is to propose a device for cooling a motor vehicle engine, correcting all or a part of the disadvantages of the prior art mentioned above.

This purpose is achieved by the fact that the device for cooling a motor vehicle engine of the type comprising a hydraulic circuit of cooling fluid, associated with a pump for circulating the fluid through the engine of the vehicle and different branches of the circuit, in which are arranged thermal equipment of the vehicle, at least some of the branches of the circuit being equipped with electronically controlled actuators to regulate the circulation of the fluid in these branches, the device comprising means for collecting information relating to the operation conditions of the vehicle, connected to means for controlling the operation of the actuators, in order to regulate the volume and the flow rate of the fluid circulating in the hydraulic circuit so as to optimize the operation of the engine, characterized in that the circuit comprises a branch equipped with an electronically controlled proportional actuator and provided with means forming direct return of fluid or bypass, the information collection means being adapted to determine the temperature of the cooling fluid, so that, when the temperature of the fluid is between specified first and second threshold temperatures, the degree of opening of the actuator is at least temporarily proportional to the temperature of the cooling fluid.

In addition, the invention may comprise one or more of the following characteristics:

when the temperature of the fluid is lower than the first threshold temperature, the control means cut off, or limit to a specified leakage flow rate, the circulation of fluid in the bypass branch, when the temperature of the fluid is greater than the second threshold temperature, the control means control at least temporarily the opening of the actuator, when the temperature of the fluid is lower than the first threshold temperature, the control means partially open the actuator so as to ensure a leakage flow rate in the bypass branch in the order of $1/50$ to $1/5$ approximately of the maximum flow of the bypass branch, when the temperature of the fluid is between the first and the second threshold temperatures, the opening of the actuator of the bypass branch increases when the temperature of the fluid increases and decreases when the temperature of the fluid decreases such that the curve representing the opening of the actuator as a function of the temperature of the fluid exhibits a hysteresis, the increase in the opening of the actuator begins after the temperature of the liquid exceeds the first reference temperature by a specified first value, the decrease in the opening of the actuator begins after the temperature of the liquid becomes lower than the second reference temperature by a specified first value, the circuit comprises a branch equipped with an actuator and provided with means forming radiator, and when the temperature of the fluid is greater than the second threshold temperature, the control means control the actuator of the bypass branch as a function of the opening and closing of the actuator of the radiator branch, so as, on the one hand, to close the actuator of the bypass branch when the actuator of the radiator branch is opened, and, on the other hand, to open the actuator of the bypass branch when the actuator of the radiator branch is closed, the closings and openings of the actuator of the bypass branch being performed simultaneously, or with a specified temperature offset relative to the openings and closings of the actuator of the radiator branch, the actuator of the radiator branch is of the proportional type, and in that the opening of the actuator of the bypass branch is inversely proportional to the opening of the actuator of the radiator bypass hose, the device comprises ventilating means, or a "Motor Ventilation Unit", adapted to cooperate with the means forming radiator, the control means ensuring the control of the ventilation means as a function of the temperature of the cooling liquid, in a manner so that the rotational speed of the ventilation means increases when the temperature of the cooling liquid increases, the increase in the rotational speed of the ventilation means is controlled as a function of the speed of variation of the temperature of the cooling liquid, the rotational speed of the ventilating means as a function of the temperature of the cooling liquid is depicted by a line whose slope is proportional to the speed of variation of the temperature of the cooling liquid.

Figure 2:
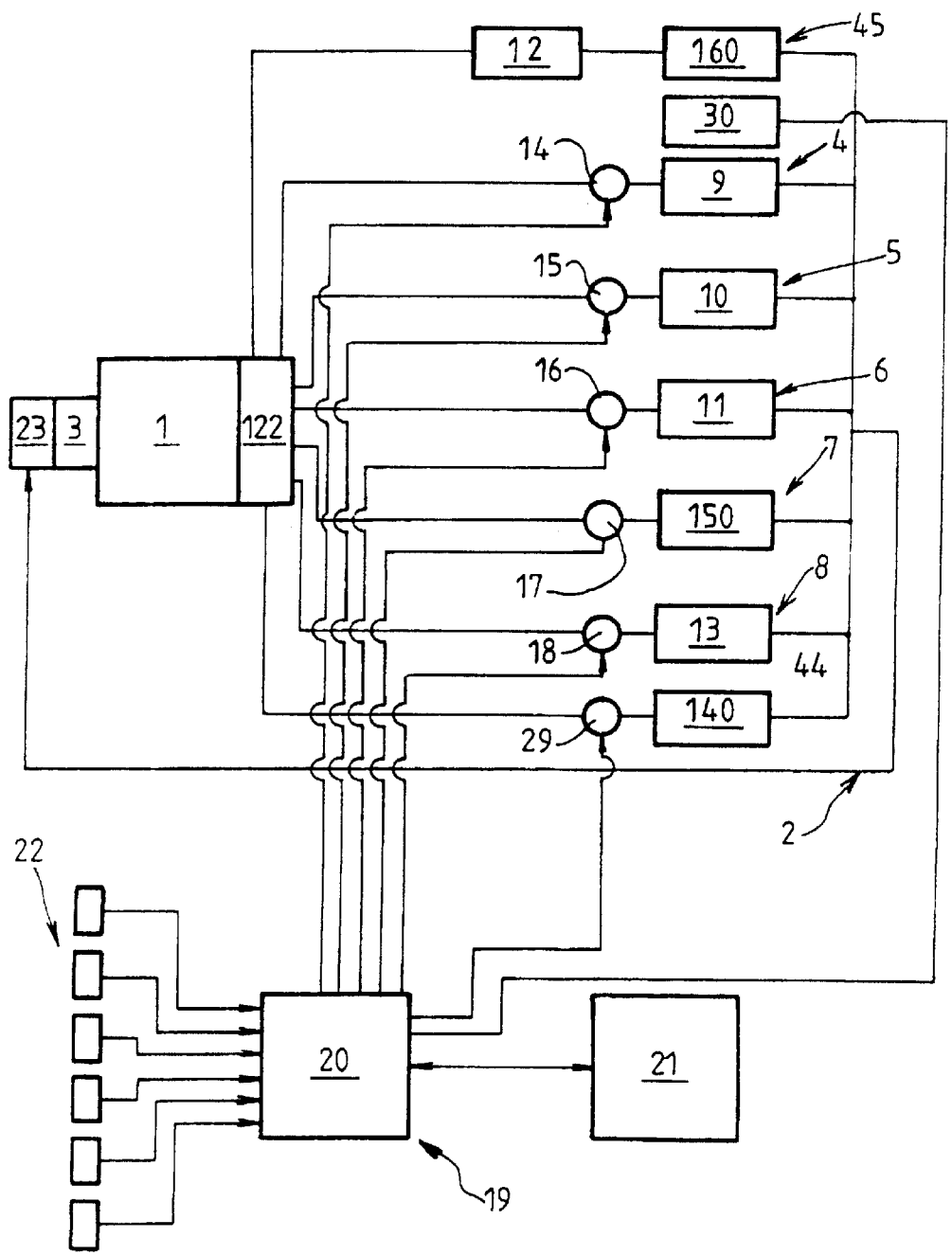
Figure 3:
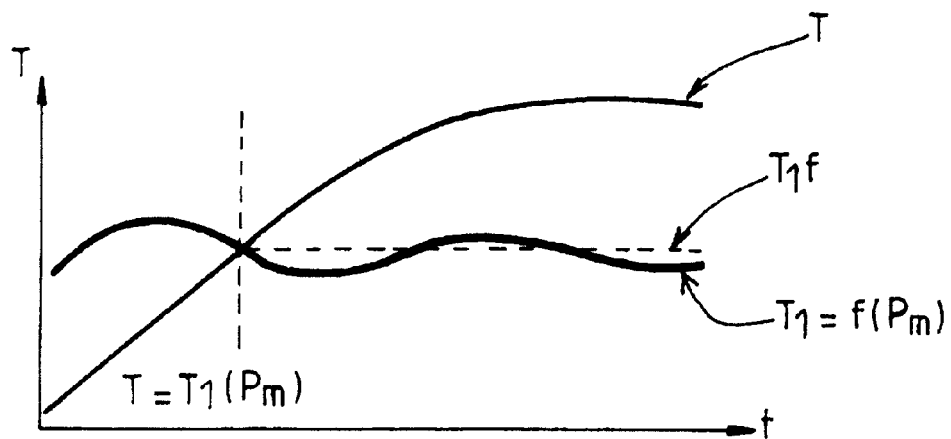
Figure 4:
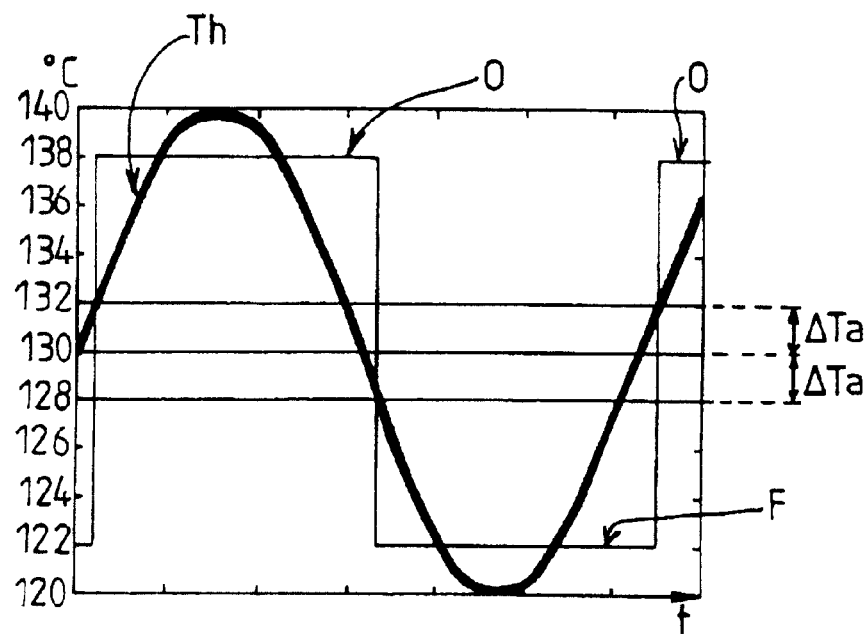
Figure 5:
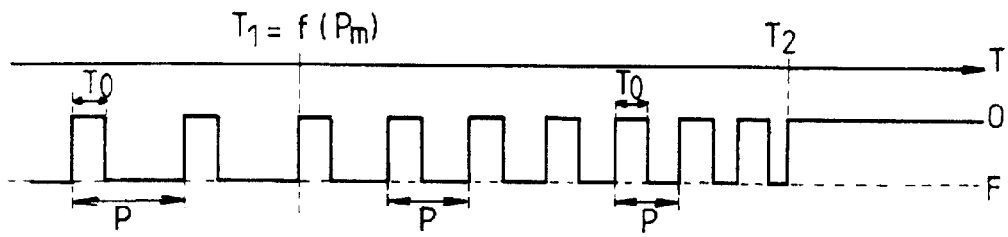
Figure 6:
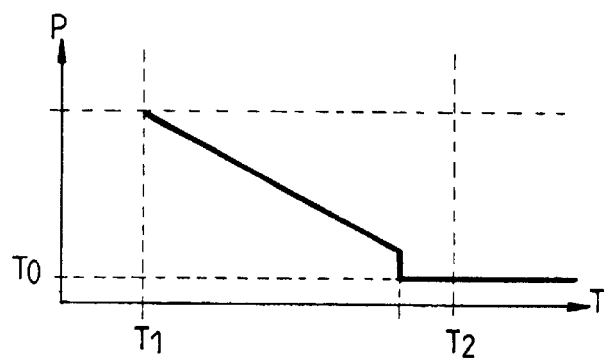
Figure 7:
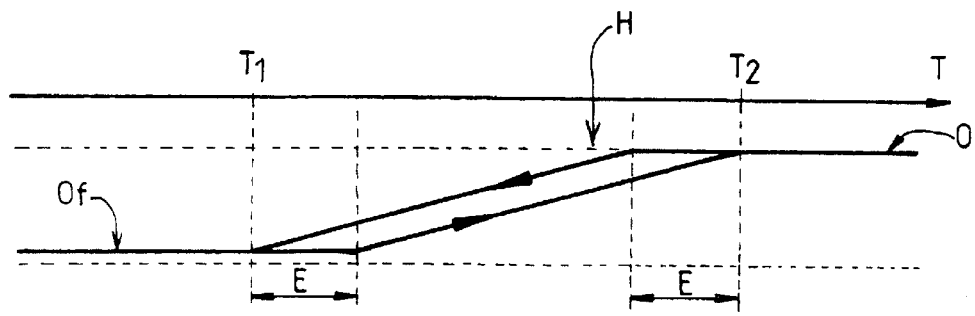
Figure 8:
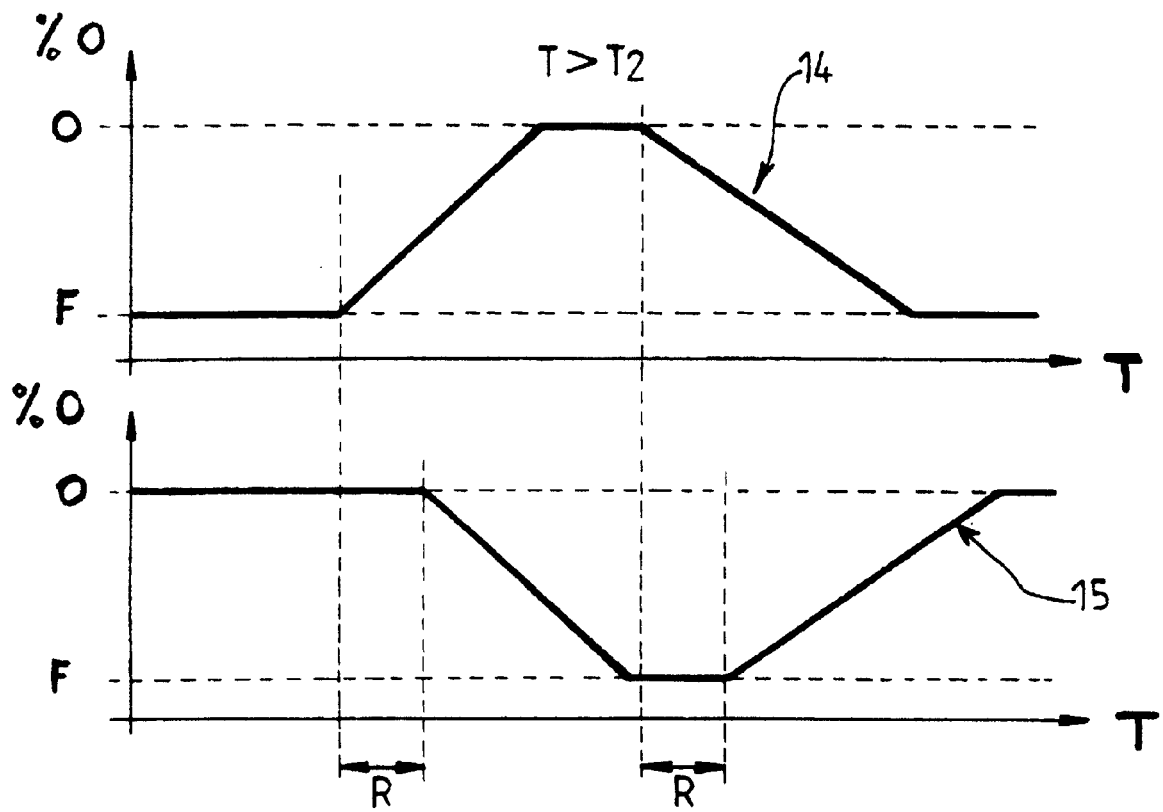
Figure 9:
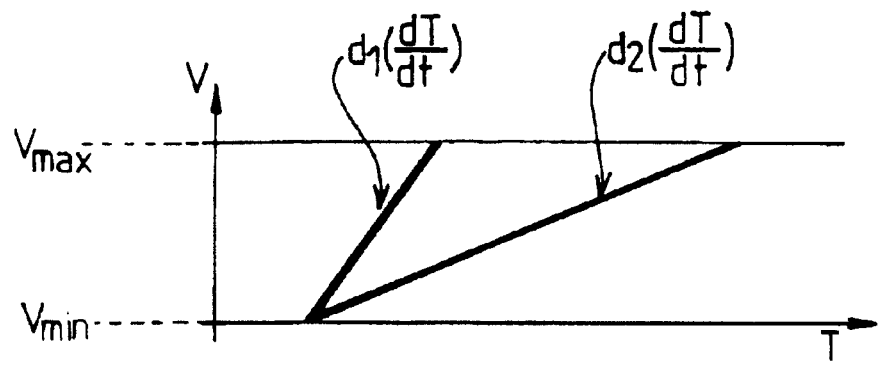

Other characteristics and advantages will appear in reading the following description, made in reference to the drawings in which:

FIG. 1 shows schematically the structure and the operation of a first example of embodiment of the cooling device according to the invention, FIG. 2 shows a second embodiment of the cooling device according to the invention, FIG. 3 shows, on a same graph, an example of variation, in the course of time t, of the temperature T of the cooling liquid and a first threshold temperature $T_1$, FIG. 4 shows an example of variation of the temperature Th of the engine lubrication oil as a function of tine t, as well as the signal that represents the opened O and closed F states of the electronically controlled actuator of the first branch of the circuit, FIG. 5 shows the opened O and closed F states of the actuator of the degassing branch as a function of the temperature T of the cooling liquid, FIG. 6 shows an example of variation of the period P of the control signal of the actuator of the degassing branch as a function of the temperature T of the cooling liquid, FIG. 7 shows the opened state of the bypass valve as a function of the temperature T of the cooling liquid, FIG. 8 shows schematically an example of coupling of the opening of the bypass valve as a function of the opening of the valve of a radiator, FIG. 9 shows two examples of variation of the rotational speed of a motor ventilation unit, as a function of the variation of the temperature T of the cooling liquid, FIG. 1 shows a preferred example of embodiment of a cooling device according to the invention. The cooling device comprises a hydraulic circuit 2 containing a cooling fluid.

A hydraulic pump 3 is associated with the circuit 2 in order to ensure the circulation of the fluid through the engine 1 and different branches 4, 5, 6, 7, 8, 44 of the circuit 2. Preferably, the pump 3 is a pump of the mechanical type, however, the use of an electric pump can also be envisioned.

The branches 4, 5, 6, 7, 8, 44 of the circuit 2 are supplied with cooling liquid from a box 122, or "Water Outlet Box" (WOB). The box 122, which is affixed to the engine 1, and preferably to the engine block 1, ensures the collection of the cooling liquid having circulated in the engine 1. The cooling liquid that has circulated in the branches is itself recovered by a water input collector 23 before its recirculation in the engine 1.

Advantageously, at least some of the branches 4, 5, 6, 7, 8, 44 of the circuit 2 are equipped with respective electronically controlled actuators 14, 15, 16, 17, 18, 29 for regulating the circulation of the fluid in these branches. The electronically controlled actuators are, for example, solenoid valves. In addition, the device comprises means 22 for collecting information relating to the operation conditions of the vehicle. The collection means 22 are connected to the means 19 for controlling the operation of at least one part of the actuators 14, 15, 16, 17, 18, 29, in order to regulate the volume and the flow rate of the fluid circulating in the hydraulic circuit 2 so as to optimize the operation of the engine.

The control means 19 or information processing unit can comprise any appropriate computer 20 such as, for example, an "Intelligent Coupling Box" (ICB) of a known type. The computer 20 is associated with means 21 for storing information comprising, for example, a programmable memory and/or a read-only memory. The computer 20 is also connected to means 22 for collecting information relating to the operation conditions of the vehicle, comprising, for example, various sensors or other computers such as an engine control computer.

Preferably, the information collection means 22 are adapted to determine at least one of the following parameters: the speed of the engine, the torque of the engine, the speed of the vehicle, the temperature of the engine lubrication oil, the temperature of the cooling liquid of the engine, the temperature of the exhaust gases of the engine, the temperature of the air outside the vehicle and the temperature inside the passenger compartment. The various items of information regarding the operation conditions of the vehicle are processed and analyzed by the computer 20, in order to control the operation of the actuators 14, 15, 16, 17, 18, 29, and possibly, the operation of the pump 3.

According to the invention, the flow rate or the volume of cooling liquid allowed or not allowed to circulate in the different branches 4, 5, 6, 7, 8, 44 of the circuit 2 is a function of the heated state of the engine 1. For example, it is possible to define three states of the engine 1, a first state in which the engine is referred to as "cold", a second in which the engine 1 is referred to as "hot" and a third state referred to as "intermediate" between the hot and cold states.

Preferably, the thermal state of the engine 1 is characterized as a function of the temperature T of the cooling liquid, preferably at the outlet of the engine 1. Thus, when the temperature of the cooling liquid is lower than a specified first threshold temperature $T_1$, the state of the engine 1 is referred to as cold. Similarly, when the temperature T of the cooling liquid is higher than a specified second threshold temperature $T_2$, the state of the engine 1 is referred to as hot. Finally, when the temperature of the cooling liquid is between the first threshold temperature $T_1$ and the second threshold temperature $T_2$, the state of the engine 1 is referred to as intermediate.

The first threshold temperature $T_1$ and/or the second threshold temperature $T_2$ can be fixed or variable values specified as a function of the type of the engine 1. Preferably, the first threshold temperature $T_1$ and/or the second threshold temperature $T_2$ are variables as a function of the type of engine 1 and of at least one operation parameter of the engine 1. For example, the first threshold temperature $T_1$ and/or the second threshold temperature $T_2$ are functions of the average power Pm supplied by the engine 1. In other words, the control means 19 cooperate with the collection means 22 in order to calculate the average instantaneous power Pm supplied by the engine 1.

The control means 19 then calculate the first threshold temperature $T_1$ and/or the second threshold temperature $T_2$, as a function of the average instantaneous power Pm and of a specified modeling of the operation of the engine 1. The modeling of the engine defines the cold, hot and intermediate states (first threshold temperature $T_1$ and second threshold temperature $T_2$) as a function of the average power Pm supplied by the engine.

The instantaneous power P(t) in kilowatts (kW) supplied by the engine at the time t is given by the following equation:

$$P(t) = \frac{2 \cdot \pi \cdot N \cdot C}{60 \times 1000},$$

where N is the instantaneous speed of the engine in rpm, and C is the instantaneous torque of the engine in N.m. The values of the speed N and the torque C can be measured by the information collection means 22, i.e., by appropriate sensors. Traditionally, the speed N of the engine is approximately between 0 and 6000 rpm, while the torque C is approximately between 0 and 350 N.m.

The control means 19 then calculate the power P(t) supplied by the engine at the time t and the average power Pm(t) supplied by the engine at the time t. The average power Pm(t) at time t can be calculated by the following equation:

$$Pm(t) = \frac{(t-1) \times Pm(t-1) + Pm(t)}{t},$$

where Pm(t−1) is the average power at the time (t−1). Of course, the average power can be calculated by any other equivalent formula, such as:

$$Pm(t) = \frac{c \cdot Pm(t-1) + kP(t)}{c+k},$$

where Pm(t−1) is the average power at the time (t−1), P(t) is the instantaneous power at the time t, and c and k are weighting coefficients.

The computer 19 and/or the information storage means 21 can contain the modeling of the operation of the engine 1, defining its cold state, hot state, and intermediate state (first threshold temperature $T_1$ and second threshold temperature $T_2$) as a function of the average power Pm. In other words, for a given type of engine, correspondence tables are created empirically and/or by calculation, giving the threshold temperatures $T_1$ and $T_2$ as a function of the average power Pm of the engine 1. These tables or models, which are a function of the type of engine, are, for example, polynomial functions. The first threshold temperature $T_1$ is thus, in general, a decreasing function of the average power.

The first threshold temperature $T_1$ can vary between 20 and 60 degrees approximately, and preferably between 30 and 50 degrees. The second threshold temperature $T_2$ can itself vary between 60 and 100 degrees approximately. However, the threshold temperature $T_2$ is generally substantially constant around the value of 80 degrees.

Thus, the control means 19 cooperate with the information collection means 22 in order to compare the temperature T of the cooling liquid with the two threshold temperatures $T_1$ and $T_2$.

For purposes of simplification, the value of the first threshold temperature $T_1$ can be fixed by the control means 19 as soon as the measured temperature T of the cooling liquid reaches the first threshold temperature $T_1$. Thus, FIG. 3 illustrates, in a same graph, an example of variation in the course of the time t: of the temperature T of the cooling liquid, and of the first threshold temperature $T_1$(Pm) which is a function of the average power. In determining these temperatures T and $T_1$(Pm), it is noted that, for a given average power, from the time when the temperature T of the fluid reaches the first threshold value T1, this first threshold temperature $T_1$ varies slightly around a constant $T_1$f.

In referring at present to FIG. 1, the circuit 2 comprises a first branch 8 equipped with a first electronically controlled actuator 18 and in which is arranged a water/oil exchanger 13. Preferably, the first actuator 18 is of the "all or nothing" type. The control means 19 cooperate with the collection means 22, in order to control the opening or closing of the first actuator 18, so as, on the one hand, to accelerate the speed of the increase in the temperature of the oil, and, on the other hand, to regulate the temperature of the oil around a specified reference temperature Tr.

More precisely, when the temperature T of the cooling fluid determined by the collection means 22 is lower than the first threshold temperature $T_1$, the control means 19 limit, and preferably stop, the circulation of the fluid in the first branch 8.

In addition, when the temperature T of the cooling liquid is higher than the second threshold temperature $T_2$, the control means 19 regulate the temperature of the oil around the reference temperature Tr. The reference temperature Tr of the oil corresponds to the optimum operation temperature of the oil. The reference temperature Tr, which depends on the type of oil, is traditionally between 120 and 140 degrees approximately, and is preferably equal to 130 degrees approximately. In order to do this, the collection means 22 comprise means for measuring the temperature of the lubricating oil, such as an appropriate sensor.

FIG. 4 illustrates an example of variation of the temperature Th of the oil as a function of the time t. In the same graph, a square pulse signal symbolizing the opened O and closed F states of the actuator 18 of the first branch 8 is shown. The upper notches of the square pulse signal show the opening times O of the actuator 18. The lower notches of the square pulse signal show the closing times F of the same actuator 18.

Thus, when the temperature Th of the oil exceeds the reference temperature Tr by a specified value ΔTa, the control means 19 ensure the opening of the actuator 18 and thus the circulation of the fluid in the first branch 8. Further, when the temperature Th of the oil is lower by a value ΔTa than the reference temperature Tr, the control means 19 close the actuator 18 and thus stop the circulation of the fluid in the first branch 8. The temperature differentials ΔTa that trigger the openings O and closings F of the first actuator 18 are on the order, for example, of one to six degrees approximately. As shown in FIG. 4, the temperature differentials ΔTa are preferably equal to two degrees.

In this manner, taking into account the thermal inertia of the system, the temperature Th of the oil can be maintained around the reference temperature Tr with a tolerance of approximately five degrees. Of course, the temperature Th of the oil can be maintained in an interval that is larger or smaller. To do this, it is sufficient to change the differentials or thresholds ΔTa of opening and closing of the first actuator 18 around the reference temperature Tr.

Advantageously, when the temperature T of the cooling liquid is between the first threshold temperature $T_1$ and the second threshold temperature $T_2$, the control means 19 can open the first actuator 18 only when the temperature of the liquid exceeds the temperature of the oil by a specified second value ΔTb. This second value ΔTb can be, for example, between 10 and 20 degrees approximately and is preferably equal to 15 degrees. In this manner, the cooling liquid contributes to accelerating the increase in the temperature of the oil.

In referring again to FIG. 1, the circuit 2 comprises a second branch 6 referred to as a "degassing" branch, equipped with an electronically controlled actuator 16 and in which a degassing box 11 is arranged.

The control means 19 regulate the circulation of the cooling fluid such that the quantity of fluid circulating in the second branch 6 is greater when the temperature T of the cooling fluid is higher than the first threshold temperature $T_1$ than when the temperature T of the fluid is lower than this first threshold temperature $T_1$.

In addition, the control means 19 regulate the circulation of the fluid in the degassing branch 6 so that the quantity of fluid circulating in it is greater when the temperature T of the fluid is higher than the second threshold temperature $T_2$ than when the temperature T of the fluid is lower than this second threshold temperature $T_2$.

Moreover, when the temperature T of the liquid is between the first threshold temperature $T_1$ and the second threshold temperature $T_2$, the control means 19 can regulate the circulation of the fluid in the degassing branch 6 as a function of the temperature T of the cooling liquid. More precisely, the control means 19 can control the increase in the quantity of cooling liquid circulating in the degassing branch 6 when the temperature T of this liquid increases. The actuator 16 of the degassing branch 6 is, preferably, of the "all or nothing", i.e., total opening or closing, type.

As shown in FIG. 5, when the temperature T of the fluid is higher than the second threshold temperature $T_2$, the control means 19 command the opening, preferably total, of the second actuator 16.

In addition, when the temperature of the cooling liquid T is lower than the first threshold temperature $T_1$, the control means 19 can control the opening of the second actuator 16 as a function of the average power Pm supplied by the engine 1. More precisely, the control means 19 increase the quantity of liquid allowed to circulate in the degassing branch 6 when the average power Pm supplied by the engine 1 increases. The actuator 16 of the branch 6 is controlled, for example, by a square pulse signal varying as a function of the average power Pm supplied by the engine 1. The upper part of the signal represents the openings O of the actuator 16, while the low part represents the closings F of the actuator 16.

When the engine is in its cold state (T<$T_1$), the square pulse control signal of the actuator 16 can be periodic. In particular, the opening time To of the actuator 16 can be constant, while the period P of the signal can vary as a function of the average power Pm. In other words, the closing times of the valve 16 can decrease, for example, linearly, when the average power Pm of the engine increases.

When the engine 1 is in its intermediate state (temperature of the liquid T between the first threshold temperature $T_1$ and the second threshold temperature $T_2$), the control means 19 control the opening of the actuator 16 according to a square pulse signal that is variable as a function of the temperature T of the cooling liquid. In particular, the opening time To of the actuator 16 can be constant, while the period P of the signal can decrease when the temperature T of the cooling liquid increases.

As shown in FIG. 6, between $T_1$ and $T_2$, the period P of the square pulse signal can be inversely proportional to the temperature T of the liquid. Moreover, when the temperature T of the liquid approaches the second threshold temperature $T_2$, the line representative of the evolution of the period P can have a discontinuity, such that the period P stays constant and equal to the opening time To. In other words, when the temperature T of the liquid reaches, for example, the second threshold temperature $T_2$ minus approximately five degrees, the decreasing line representing the period P is followed by a constant horizontal portion.

The opening time To of the actuator 16 can be on the order of several seconds, and, for example, five seconds. The period of the control signal of the actuator 16 can itself vary, for example, between 5 and 50 seconds.

Of course, any other type of appropriate signal can be used in order to control the second actuator 16. For example, as in the above, it is possible to make the opening time To of the valve vary, in addition to or instead of the closing time.

As shown in FIG. 1, the circuit 2 comprises a third branch 5 equipped with an electronically controlled actuator 15 and associated with means 10 forming direct return of the fluid or bypass. The control means 19 can regulate the circulation of the cooling fluid in the bypass branch 5 as a function of the temperature T of this fluid. In particular, the quantity of fluid allowed to circulate in the bypass branch 5 increases when the temperature of the fluid increases from the first threshold temperature $T_1$ to the second threshold temperature $T_2$. Preferably, the electronically controlled actuator 15 of the bypass branch 5 is of the proportional type.

As shown in FIG. 7, when the temperature of the fluid T is lower than the first threshold temperature $T_1$, the control means 19 can limit the circulation of the fluid in the bypass branch 5 to a specified leakage rate. In other words, the actuator 15 of the bypass branch 5 is partially open Of. For example, the partial opening of the actuator 15 can ensure a leakage rate in the bypass branch 5 of between 1/50 and 1/5 approximately of the maximum flow of the bypass branch 5.

When the temperature of the fluid is higher than the second threshold temperature $T_2$, the control means 19 command at least temporarily the total opening O of the bypass actuator 15 (FIG. 7). In addition, when the temperature of the fluid is between the first threshold temperature $T_1$ and the second threshold temperature $T_2$, the degree of opening of the actuator 15 can be at least temporarily proportional to the temperature T of the cooling fluid. More precisely, between $T_1$ and $T_2$, the opening of the actuator 15 of the bypass increases when the temperature T of the fluid increases, and decreases when the temperature T of the fluid decreases. The variation of the opening of the actuator 15 can be proportional to the temperature T of the fluid.

Advantageously, the curve that is representative of the opening of the actuator 15 as a function of the temperature T of the fluid can have a hysteresis H. In other words, the increase in the opening of the actuator 15 begins after the temperature of the liquid T exceeds the first reference temperature $T_1$ by a specified first value E. Similarly, the reduction in the opening of the actuator 15 begins after the temperature T of the liquid becomes lower, by a specified first value E, than the second reference temperature $T_2$. In other words, openings and closings of the actuator 15 are done in a manner offset relative to the threshold temperatures $T_1$ and $T_2$. The values E of these offsets are, for example, on the order of 5 degrees.

In referring again to FIG. 1, the circuit comprises a fourth branch 4 equipped with an electronically controlled actuator 14 and provided with means 9 forming a radiator. The radiator means 9 can be coupled to a motor ventilation unit 30, which itself can also be controlled by the control means 19. The actuator 14 of the fourth branch 4 is of the proportional type.

Advantageously, when the temperature T of the fluid is higher than the second threshold temperature $T_2$, the control means 19 can control the actuator 15 of the bypass branch 5 as a function of the opening and closing of the actuator 14 of the radiator branch 4.

FIG. 8 illustrates the percentage of opening % O of the actuators 15, 14 of the third and fourth branches 5, 4 as a function of the temperature T of the cooling liquid. As shown in FIG. 8, the control means 19 can close F the actuator 15 of the bypass branch 5 when the actuator 14 of the radiator branch 4 is open O. Similarly, the actuator 15 of the bypass branch 5 is open O when the actuator 14 of the radiator branch 4 is closed F. Preferably, the opening of the actuator 15 of the bypass branch 5 is inversely proportional to the opening of the actuator 14 of the radiator branch 4.

In addition, the closings and openings of the actuator 15 of the bypass branch 5 can be performed with a specified temperature offset R relative to the openings and closings of the actuator 14 of the radiator branch 4. The temperature offset R can be on the order of several degrees, for example, five degrees.

As shown in FIG. 9, the control means 19 can control the ventilation means 30 as a function of the temperature of the cooling liquid. More precisely, the rotational speed of the ventilation means 30 can increase when the temperature T of the cooling liquid increases.

Preferably, the rotational speed V of rotation of the ventilation means 30 increases proportionally to the speed of variation of the temperature of the cooling liquid $$\frac{dT}{dt}.$$

FIG. 9 illustrates two examples of lines d1 and d2 representing the rotational speed of the motor ventilation unit as a function of the temperature T of the liquid. The two lines d1 and d2 have different slopes each of which is representative of a speed of variation $$\frac{dT}{dt}$$

of the temperature T of the cooling liquid. The speed of variation $$\frac{dT}{dt}$$

of the temperature T of the cooling liquid can be calculated by the control means 19.

The cooling circuit 2 shown in FIG. 1 also comprises a fifth branch 7 equipped with an electronically controlled actuator 17 and in which means 12 are arranged, forming an air heater of the passenger compartment. Traditionally, the air heater means 17 can be formed in order to ensure the heating of the passenger compartment to a first setpoint temperature Tc determined by the user of the vehicle.

The control means 20 cooperate with the information collection means 22 in order to determine the temperature Te outside the vehicle. When the outside temperature Te is lower than the first desired temperature Tc, the control means 20 can open the actuator of the air heater branch 7. In the same way, when the outside temperature Te is higher than the first setpoint temperature Tc, the control means 20 can close the actuator of the air heater branch 7.

In the same way, the air heater means 12 can comprise a function of air-conditioning the passenger compartment at a second setpoint temperature Tr. Thus, when the outside temperature Te is lower than the second setpoint temperature Tr, the control means 20 can open the actuator of the air heater branch 7. Similarly, when the outside temperature Te is higher than the second desired temperature Tr, the control means 20 can close the actuator of the air heater branch 7.

This fifth branch 7 can also possibly comprise additional heating means 160 and/or means 150 for recirculating exhaust gases of the engine 1 to the intake. Traditionally, these means 150 for recirculating at least a portion of the exhaust gases of the engine 1 to the intake or "Exhaust Gas Recycling (EGR)" make it possible to control the temperature of the combustion gases of the engine for, for example, an anti-pollution treatment.

Finally, the circuit 2 shown in FIG. 1 comprises a sixth branch 44 in which means 140 for reheating the intake air of the engine 1 are located. This sixth branch 44 is also equipped with an electronically controlled actuator 29 controlled by the control means 19.

FIG. 2 illustrates an embodiment variation of the cooling device according to the invention. The device shown in FIG. 2 differs from that of FIG. 1 in that the air heater means 12 and the heating means 160 are arranged in a seventh branch 45 that is distinct from the sixth branch 7 associated with the means 150 for recirculating the exhaust gases (EGR). In addition, the seventh branch 45 is not provided with an electronically controlled actuator.

Of course, the invention is not limited to the examples of embodiments in FIGS. 1 and 2. In fact, the cooling device can comprise only one part of the thermal equipment 9, 10, 11, 12, 13, 140, 150, 16 and/or branches 4, 5, 6, 7, 8, 44, 45 described above. Moreover, one or more of the branches 4, 5, 6, 7, 8, 44, 45 can be provided without an electronically controlled actuator.

Advantageously, the information collection means 22 can be adapted to detect a possible malfunction of at least one of the electronically controlled actuators. In this way, when at least one malfunction of an actuator is detected and regardless of the temperature of the fluid, the control means 19 can ensure the free circulation of the fluid in at least some of the branches, and preferably in all of the branches. In other words, when a malfunction of the system is detected, all of the valves of the circuit 2 are open.

Thus, it is easy to understand that the cooling device according to the invention, while having a simple structure, makes it possible to manage heat exchanges in real time and in an optimum manner.

Finally, though the invention has been described in connection with specific embodiments, it comprises all technical equivalents of the means described.

The invention claimed is:

1. Method for cooling a motor vehicle engine, which consists in regulating the volume and the flow rate of a cooling fluid in a hydraulic circuit provided with a bypass branch equipped with an electronically controlled proportional actuator and provided with means forming direct return of fluid or bypass, the method comprising:

a step of determining the temperature (T) of the cooling fluid, a step of comparing the temperature (T) determined with a first ($T_1$) and a second ($T_2$) specified threshold temperatures, and a step of controlling the opening of the actuator, so that, when the temperature (T) of the fluid is between the first ($T_1$) and the second ($T_2$) threshold temperatures, the degree of opening of the actuator at least temporarily increases when the temperature (T) of the fluid increases and decreases when the temperature (T) of the fluid decreases.

2. Method according to claim 1, wherein, when the temperature (T) of the fluid is lower than the first threshold temperature ($T_1$), the method comprises a step of cutting off, or limiting to a specified leakage flow rate, the circulation of the fluid in the bypass branch.

3. Device for cooling a motor vehicle engine, of the type comprising a hydraulic circuit of cooling fluid, associated with a pump for circulating it through the engine of the engine of the vehicle and different branches of the circuit, in which are arranged thermal equipment of the vehicle, at least some of the branches of the circuit being equipped with electronically controlled actuators to regulate the circulation of the fluid in these branches, the device comprising:

means for collecting information relating to the operation conditions of the vehicle, connected to means for controlling the operation of the actuators, in order to regulate the volume and the flow rate of fluid circulating in the hydraulic circuit so as to optimize the operation of the engine, wherein the circuit comprises a bypass branch equipped with an electronically controlled proportional actuator and provided with means forming direct return of fluid or bypass, the information collection means being adapted to determine the temperature (T) of the cooling fluid so that, when the temperature of the fluid is between a first ($T_1$) and a second ($T_2$) threshold temperatures, the degree of the opening of the actuator at least temporarily increases when the temperature (T) of the fluid increases and decreases when the temperature (T) of the fluid decreases.

4. Device according to claim 3, wherein, when the temperature (T) of the fluid is lower than the first threshold temperature ($T_1$), the control means cut off, or limit to a specified leakage flow rate, the circulation of the fluid in the bypass branch.

5. Device according to claim 3, wherein, when the temperature (T) of the fluid is higher than the second threshold temperature ($T_2$), the control means control at least temporarily the opening of the actuator.

6. Device according to claim 3, wherein, when the temperature (T) of the fluid is lower than the first threshold temperature ($T_1$), the control means partially open the actuator, so as to ensure a leakage flow rate in the bypass branch in the order of 1/50 to 1/5 approximately of the maximum flow of the bypass branch.

7. Device according to claim 3, wherein, when the temperature (T) of the liquid is between the first ($T_1$) and the second ($T_2$) threshold temperatures, the opening of the actuator of the bypass branch increases when the temperature (T) of the fluid increases, and decreases when the temperature (T) of the fluid decreases, such that the curve representative of the opening of the actuator as a function of the temperature of the fluid exhibits a hysteresis (H).

8. Device according to claim 7, wherein the increase in the opening of the actuator begins after the temperature (T) of the liquid exceeds the first reference temperature ($T_1$) by a specified first value (E).

9. Device according to claim 7, wherein the decrease in the opening of the actuator begins after the temperature (T) of the liquid becomes lower than the second reference temperature ($T_2$) by a specified first value (E).

10. Device for cooling a motor vehicle engine, of the type comprising a hydraulic circuit of cooling fluid, associated with a pump for circulating it through the engine of the vehicle and different branches of the circuit, in which are arranged thermal equipment of the vehicle, at least some of the branches of the circuit being equipped with electronically controlled actuators to regulate the circulation of the fluid in these branches, the device comprising means for collecting information relating to the operation conditions of the vehicle, connected to means for controlling the operation of the actuators, in order to regulate the volume and the flow rate of fluid circulating in the hydraulic circuit so as to optimize the operation of the engine, wherein the circuit comprises a bypass branch equipped with an electronically controlled proportional actuator and provided with means forming direct return of fluid or bypass, the information collection means being adapted to determine the temperature (T) of the cooling fluid so that, when the temperature of the fluid is between a first ($T_1$) and a second ($T_2$) threshold temperatures, the degree of the opening of the actuator at least temporarily increases when the temperature (T) of the fluid increases and decreases when the temperature (T) of the fluid decreases, wherein, when the temperature (T) of the fluid is higher than the second threshold temperature ($T_2$), the control means control at least temporarily the opening of the actuator, and wherein the circuit comprises a branch equipped with an actuator and provided with means forming radiator, and, when the temperature of the fluid is higher than the second threshold temperature ($T_2$), the control means control the actuator of the bypass branch as a function of the opening and closing of the actuator of the radiator branch, so as, on the one hand, to close the actuator of the bypass branch when the actuator of the radiator branch is opened, and, on the other hand, to open the actuator of the bypass branch when the actuator of the radiator branch is closed, the closings and openings of the actuator of the bypass branch being performed simultaneously, or with a specified temperature offset (R), relative to the openings and closings of the actuator of the radiator branch.

11. Device according to claim 10, wherein the actuator of the radiator branch is of the proportional type, and in that the opening of the actuator of the bypass branch is inversely proportional to the opening of the actuator of the radiator branch.

12. Device according to claim 10, wherein the device comprises ventilating means, or a "motor ventilation unit", adapted to cooperate with the means forming radiator, the control means ensuring the control of the ventilation means as a function of the temperature of the cooling liquid, so that the rotational speed of the ventilation means increases when the temperature (T) of the cooling liquid increases.

13. Device according to claim 12, wherein the increase in the rotational speed (V) of the ventilation means is controlled as a function of the speed $$\left(\frac{dT}{dt}\right)$$

of the variation of the temperature (T) of the cooling liquid.

14. Device according to claim 13, wherein the rotational speed of the ventilation means as a function of the temperature (T) of the cooling liquid is depicted by a line whose slope is proportional to the speed $$\left(\frac{dT}{dt}\right)$$

of the variation of the temperature of the cooling liquid.

15. Device according to claim 4, wherein, when the temperature (T) of the fluid is higher than the second threshold temperature ($T_2$), the control means control at least temporarily the opening of the actuator.

16. Device according claim 4, wherein, when the temperature (T) of the fluid is lower than the first threshold temperature ($T_1$), the control means partially open the actuator, so as to ensure a leakage flow rate in the bypass branch in the order of 1/50 to 1/5 approximately of the maximum flow of the bypass branch.

17. Device according claim 5, wherein, when the temperature (T) of the fluid is lower than the first threshold temperature ($T_1$), the control means partially open the actuator, so as to ensure a leakage flow rate in the bypass branch in the order of 1/50 to 1/5 approximately of the maximum flow of the bypass branch.

18. Device according to claim 4, wherein, when the temperature (T) of the liquid is between the first ($T_1$) and the second ($T_2$) threshold temperatures, the opening of the actuator of the bypass branch increases when the temperature (T) of the fluid increases, and decreases when the temperature (T) of the fluid decreases, such that the curve representative of the opening of the actuator as a function of the temperature of the fluid exhibits a hysteresis (H).

19. Device according to claim 5, wherein, when the temperature (T) of the liquid is between the first ($T_1$) and the second ($T_2$) threshold temperatures, the opening of the actuator of the bypass branch increases when the temperature (T) of the fluid increases, and decreases when the temperature (T) of the fluid decreases, such that the curve representative of the opening of the actuator as a function of the temperature of the fluid exhibits a hysteresis (H).

20. Device according to claim 6, wherein, when the temperature (T) of the liquid is between the first ($T_1$) and the second ($T_2$) threshold temperatures, the opening of the actuator of the bypass branch increases when the temperature (T) of the fluid increases, and decreases when the temperature (T) of the fluid decreases, such that the curve representative of the opening of the actuator as a function of the temperature of the fluid exhibits a hysteresis (H).

21. Method according to claim 1, wherein, when the temperature (T) of the liquid is between the first ($T_1$) and the second ($T_2$) threshold temperatures, the opening of the actuator of the bypass branch is at least temporarily proportional to a difference between the second ($T_2$) threshold temperature and the temperature (T) of the fluid.

22. Device according to claim 3, wherein, when the temperature (T) of the liquid is between the first ($T_1$) and the second ($T_2$) threshold temperatures, the opening of the actuator of the bypass branch is at least temporarily proportional to a difference between the second ($T_2$) threshold temperature and the temperature (T) of the fluid.

23. Device according to claim 10, wherein, when the temperature (T) of the liquid is between the first ($T_1$) and the second ($T_2$) threshold temperatures, the opening of the actuator of the bypass branch is at least temporarily proportional to a difference between the second ($T_2$) threshold temperature and the temperature (T) of the fluid.

* * * * *